United States Patent [19]

Mitumaru

[11] Patent Number: 4,619,458
[45] Date of Patent: Oct. 28, 1986

[54] FLUID-TIGHT SHAFT MOUNTING WITH LEAKAGE DRAINAGE MEANS

[75] Inventor: Mititosi Mitumaru, Kashiwara, Japan

[73] Assignee: Koyo Seiko Company Limited, Osaka, Japan

[21] Appl. No.: 814,372

[22] Filed: Dec. 30, 1985

[30] Foreign Application Priority Data

Oct. 15, 1985 [JP] Japan ............... 60-230704

[51] Int. Cl.$^4$ ............... F16J 15/38
[52] U.S. Cl. ............... 277/24; 277/71; 277/79; 277/81 R; 277/203
[58] Field of Search ............... 277/12, 32, 24, 70, 277/71, 72 R, 79, 81 R, 203

[56] References Cited

U.S. PATENT DOCUMENTS

| 2,127,151 | 8/1938 | Oldinger ............... 277/71 X |
| 3,097,854 | 7/1963 | Kaiser ............... 277/24 |
| 3,511,513 | 5/1970 | Dahlheimer ............... 277/82 |
| 3,643,964 | 2/1972 | Snelling et al. ............... 277/24 |
| 4,402,515 | 9/1983 | Malott ............... 277/24 |

FOREIGN PATENT DOCUMENTS 6503395 9/1966 Netherlands ............... 277/70

Primary Examiner—Robert S. Ward
Attorney, Agent, or Firm—Cushman, Darby & Cushman

[57] ABSTRACT

A fluid-tight shaft mounting for rotatably and fluid-tightly supporting a shaft member having one end rigidly mounted with a driven element, for example, a pump impeller, which mounting comprises a generally tubular housing through which the shaft member extends, a sealed bearing assembly positioned within the housing and exteriorly around the shaft member for the support of the shaft member relative to the housing, and an axial-mechanical face seal assembly interposed between the driven element and the sealed bearing assembly and exteriorly around the shaft member. The housing has at least one passage defined therein for communicating an annular space between the bearing assembly and the face seal assembly, with the outside of the housing. It also comprises an annular partition member disposed around the shaft within the annular space, dividing the annular space into a pair of annular chambers that are communicated with the passage in the housing.

3 Claims, 6 Drawing Figures

FLUID-TIGHT SHAFT MOUNTING WITH LEAKAGE DRAINAGE MEANS

BACKGROUND OF THE INVENTION

The present invention relates to the art of fluid-tightly and rotatably supporting a shaft member in a water pump.

There is known a fluid-tight shaft mounting comprising a generally tubular housing through which the shaft member extends, a sealed bearing assembly positioned within the housing and exteriorly around the shaft member for the support of the shaft member relative to the housing, and a seal assembly interposed between a driven element, for example, an impeller of the water pump, and the bearing assembly and exteriorly around the shaft member, such as disclosed in, for example, U.S. Pat. No. 3,511,513, patented May 12, 1970.

According to the above mentioned U.S. patent, the seal assembly is employed in the form of a combination axial-mechanical face and radial seal element including a dynamic radial seal in sliding engagement with the peripheral surface of the shaft member and an axial-mechanical face seal including a ring-shaped seal seat rotatable together with the shaft member and a generally ring-shaped seal washer elastically biased so as to slidingly engage the seal seat. Between the bearing assembly and the combination face and radial seal element, there is formed an annular space which is communicated with the outside through a drain hole defined in the housing for the drainage of any leakage entering such annular space past the combination face and radial seal element.

The combination axial-mechanical face and radial seal used in the above mentioned U.S. patent is operable to prevent a fluid medium within, for example, the pump casing in which the impeller is disposed, from leaking into the bearing assembly. However, it has been found that the seal is not complete in that no fluid compressed enough to evolve heat can be prevented from leaking. In most pump applications, the fluid medium leaks past the combination face and radial seal and the bearing assembly in the form of a vapor.

As a matter of course, when a portion of the shaft member on one side of the combination face and radial seal opposite to the impeller is wetted with the water vapor leaking past the combination face and radial seal, rusting will be initiated on that portion of the shaft member, which will eventually constitute a cause of frictional wear of the seal elements used. Equally, when the vapor enters the bearing assembly, some component parts of the bearing assembly will rust to such an extent as to result in the counter-leakage of a lubricant from the bearing assembly into the pump casing past the combination face and radial seal, with the service life of the pump as a whole eventually reduced. This is because the vapor leaking past the seal assembly cannot be completely discharged to the outside of remains afloat around the shaft member.

In addition, the prior art fluid-tight shaft mounting such as disclosed in the above mentioned U.S. patent has another disadvantage in that, since the assembly of the shaft member with the bearing assembly and the combination axial-mechanical face and radial seal assembly are handled as members separate from each other, the mounting of the shaft member requires a complicated and time-consuming procedure.

SUMMARY OF THE INVENTION

The present invention has been developed with a view to substantially eliminating the above described disadvantages and inconveniences inherent in the prior art fluid-tight shaft mounting and has for its essential object to provide an improved fluid-tight shaft mounting for a water pump which is reliable in operation to seal any leakage off from the bearing assembly and utilize a minimized number of parts easy to fabricate together.

In order to accomplish the above described object, there is provided a fluid-tight shaft mounting for rotatably and fluid-tightly supporting a shaft member having one end rigidly mounted with a driven element, for example, a pump impeller, which mounting comprises a generally tubular housing through which the shaft member extends, a sealed bearing assembly positioned within the housing and exteriorly around the shaft member for the support of the shaft member relative to the housing, and an axial-mechanical face seal assembly interposed between the driven element and the sealed bearing assembly and exteriorly around the shaft member. The housing has at least one passage defined therein for communicating an annular space between the bearing assembly and the face seal assembly, with the outside of the housing.

In accordance with the present invention, the fluid-tight shaft mounting is provided with an annular partition member disposed around the shaft member within the annular space between the assemblies so as to extend generally radially outwardly of the shaft member in register with the passage in the housing. This partition member divides the annular space into first and second annular chambers adjacent the bearing assembly and the face seal assembly, respectively, and is constituted by an annular radial body having its outer periphery formed with first and second axial flanges that protrude perpendicular to the radial body in opposite directions away from each other and terminate in abutment respectively with a portion of the bearing assembly and a portion of the face seal assembly. The radial body has its inner peripheral face spacedly surrounding the shaft member and formed with guide grooves. The first and second axial flanges have respective passage means defined therein to establish fluid circuits between the passage in the housing and the first annular chamber and between the passage in the housing and the second annular chamber.

BRIEF DESCRIPTION OF THE DRAWINGS

This and other objects and features of the present invention will become clear from the following detailed description of a preferred embodiment taken with reference to the accompanying drawings, in which.

DETAILED DESCRIPTION OF THE EMBODIMENT

Figure 1:
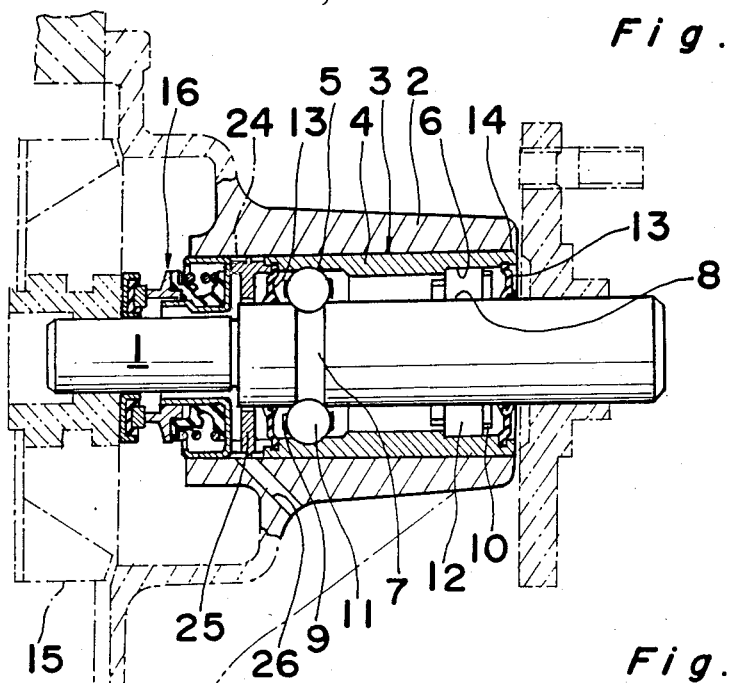
FIG. 1 is a longitudinal sectional view of a fluid-tight shaft mounting of the present invention as applied to a water pump.

Referring first to FIG. 1, a shaft 1 having an impeller 15 of, for example, a water pump, rigidly mounted on one end thereof for rotation together therewith extends through a tubular housing 2 forming an integral part of the pump casing and is rotatably supported within the housing 2 by means of a sealed ball-and-roller bearing assembly 3. The sealed ball-and-roller bearing assembly 3 comprises a bearing outer race 4 having its inner peripheral surface formed with a circumferentially extending ball guide groove 5 and a circumferentially extending roller guide groove 6 spaced axially from the ball guide groove 5, a plurality of balls 11 rotatably seated between the ball guide groove 5 and a circumferentially extending, similar ball guide groove 7 in the shaft 1, and a plurality of rollers 12 rollingly seated between the roller guide groove 6 and a circumferentially extending, similar roller guide groove 8 in the shaft 1. The balls 11 operating in the grooves 5 and 7 are retained in position by a retainer 9 in circumferentially equally spaced relation to each other and, likewise, the rollers 12 operating in the grooves 6 and 8 are retained in position by a retainer 10 in circumferentially equally spaced relation to each other. The outer race 4 carries a pair of spaced annular sealing members 13 having their outer peripheral edges engaged in circumferentially extending retaining grooves defined in the inner peripheral surface of the outer race 4 adjacent the opposite ends thereof, respectively, the inner peripheral edges of the respective sealing members 13 being so slidingly engaged with the shaft 1 as to seal an annular space which is delimited between the sealing members 13 and between the shaft 1 and the outer race 4 and accommodates the balls 11 and the rollers 12 and their associated retainers 9 and 10.

An axial-mechanical face seal assembly according to the present invention is generally identified by 16 and is operatively positioned exteriorly around the shaft 1 and between the hub of the impeller 15, shown by the phantom line, and the ball-and-roller bearing assembly 3, the details of said face seal assembly 16 being described with particular reference to FIGS. 2 to 5.

Figure 2:
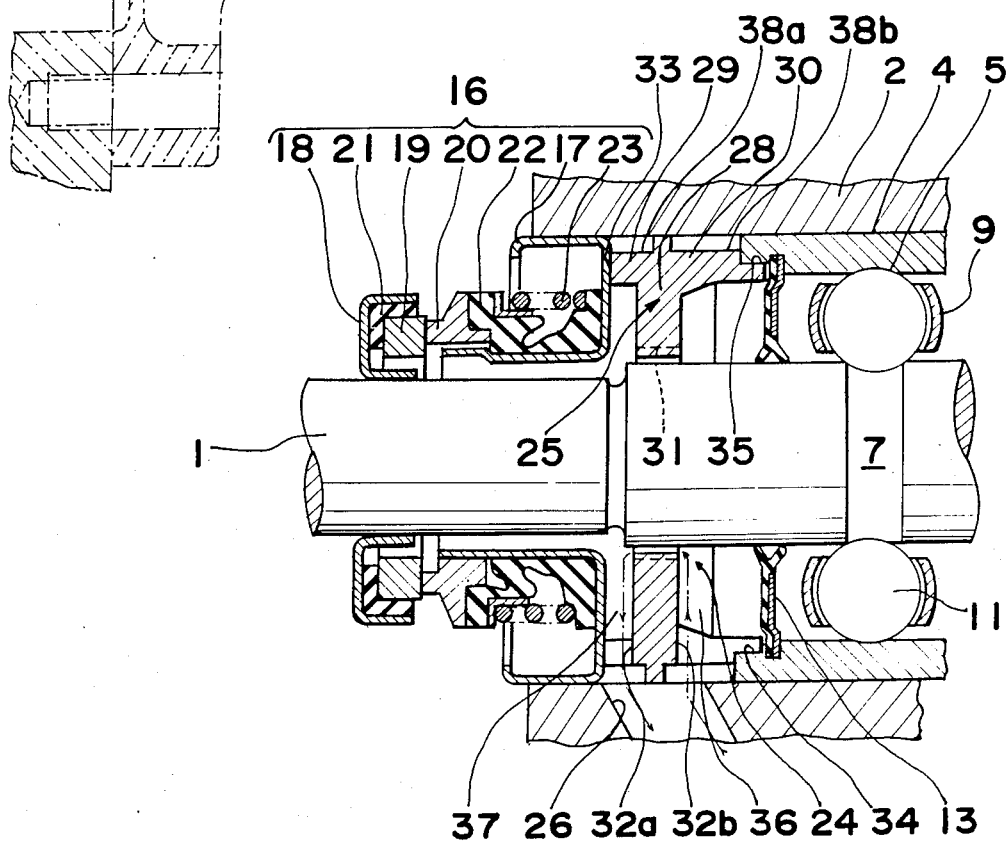
FIG. 2 is a fragmentary longitudinal sectional view, on an enlarged scale, of the shaft mounting showing the details of a sealing assembly used therein.
Figure 3:
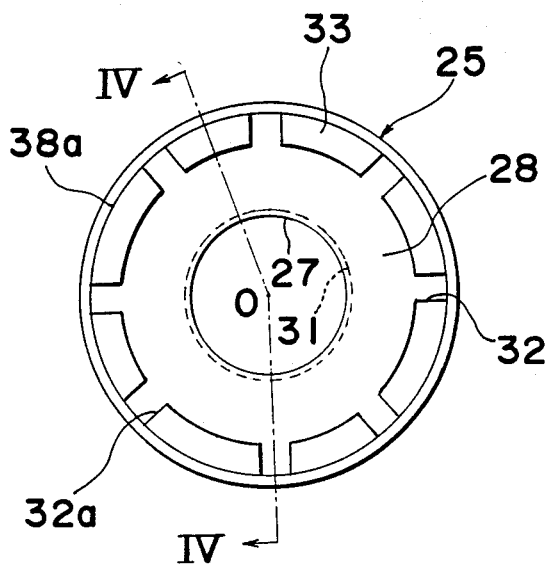
FIG. 3 is a left-hand end view, as viewed in FIGS. 1 or 2, of an annular partition member used in the sealing assembly, shown on a scale intermediate between FIGS. 1 and 2.
Figure 4:
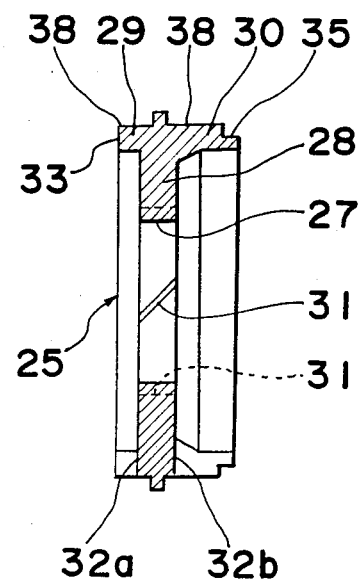
FIG. 4 is a cross-sectional view of the annular partition member taken along the line IV—IV in FIG. 3.
Figure 5:
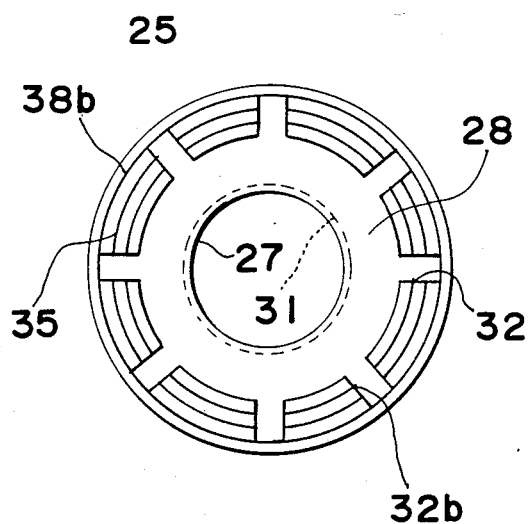
FIG. 5 is a right-hand end view, as viewed in FIGS. 1 or 2, of the annular partition member.

The axial-mechanical face seal assembly 16 comprises, as best shown in FIG. 2, an annular outer retaining member 17 of generally U-shaped cross-section press-fitted into the housing 2 and opening towards the impeller 15, an annular inner retaining member 18 of generally U-shaped cross-section rigidly mounted on the shaft 1 for rotation together therewith and in axially spaced relation to the outer retaining member 17 and opening towards the outer retaining member 17, a rotatable seal ring 19 fixedly carried by the inner retaining member 18 through a ringshaped buffer member 21 in coaxial relation to the shaft 1 so as to confront the outer retaining member 17, a stationary seal ring 20 axially displaceably carried by the outer retaining member 17 in coaxial relation to the shaft 1 so as to confront the inner retaining member 18, a bellows type annular elastic member 22 mounted exteriorly on an axially extending inner wall portion of the outer retaining member 17 and situated between the stationary seal ring 20 and a radial wall portion of the outer retaining member 17, and a biasing element, for example, a coil spring 23 exteriorly received in the elastic member 22 in coaxial relation to the shaft 1 for urging the stationary seal ring 20 so as to slidingly contact the rotatable seal ring 19.

The axial-mechanical face seal for substantially eliminating the leakage of harmful fluids from a pump chamber, in which the impeller 15 is disposed, into the ball-and-roller bearing assembly 3 is formed by the meeting of the rotatable and stationary ring seals 19 and 20. However, in view of the fact that the presentday seal engineering is still remote from the accomplishment of perfect sealing, a portion of the harmful fluids may leak past the axial-mechanical face seal assembly 16, at least in the form of vapor, particularly where the fluid being pumped is of elevated temperature and under high pressure. For the purpose of drainage of any leakage, the housing 2 has a pair of circumferentially spaced drain holes defined therein in communication with a space 24 delimited within the housing 2 between the axial-mechanical face seal assembly 16 and the ball-and-roller bearing assembly 3, one of which holes is shown by 26 in FIG. 2.

The space 24 between the assemblies 16 and 3 is retained by an annular partition member 25 mounted around the shaft 1 within the housing 2 in alignment with the drain holes 26, which member 24 concurrently forms a part of the drain system in cooperation with the drain holes 26. More specifically, as best shown in FIGS. 2 to 5, the partition member 25 is in the form of a distance piece comprising an annular radial body 28 of such an outer diameter as to permit the outer peripheral face thereof to fluid-tightly contact the inner peripheral surface of the housing 2, and a pair of axial flanges 29 and 30 integral with an outer peripheral portion of the radial body 28 and protruding perpendicular to the radial body 28 in opposite directions away from each other. The radial body 28 has an inner diameter greater than the diameter of the shaft 1 with a gap consequently formed between the shaft 1 and the inner peripheral face 27, said inner peripheral face 27 being formed with one or more helical grooves 31. The partition member 25 of the above described construction is disposed within the space 24 with the outer peripheral face of the radial body 28 fluid-tightly contacting the inner peripheral surface of the housing 2 while the shaft 1 loosely extends through the bore of the radial body 28. At this time, an annular free end face 33 of the axial flange 39 is held in abutment with the radial wall portion of the outer retaining member 17 whereas an annular free end face 35 of the axial flange 30 is stepped to tightly engage one end 34 of the outer race 4 adjacent the face seal assembly 16. Thus, it will readily be seen that, with the partition member 25 so mounted within the housing 2, the space 24 between the face seal assembly 16 and the bearing assembly 3 is divided into left-hand and right-hand annular chambers 37 and 36 adjacent the face seal assembly 16 and the bearing assembly 3, respectively. These left-hand and right-hand annular chambers 37 and 36 are communicated with each other through the annular gap between the inner peripheral face 27 of the radial body 28 and the shaft 1.

The axial flange 29 protruding axially of the housing 2 from the radial body 28 towards the face seal assembly 16 has its outer periphery formed with a radially inwardly recessed and circumferentially extending annular groove 38a communicated with the left-hand chamber 37 of the space 24 through a plurality of radially extending passages 32a defined in the free end portion of said axial flange 29 in cooperation with the radial wall portion of the outer retaining member 17. Similarly, the axial flange 30 protruding axially of the housing 2 from the radial body 28 towards the bearing assembly 3 has its outer periphery formed with a radially inwardly recessed and circumferentially extending annular groove 38b communicated with the right-hand chamber 36 of the space 24 through a plurality of radially extending passages 32b defined in the free end portion of said axial flange 30 in cooperation with the end 34 of the outer race 4. With the partition member 25 so constructed as hereinbefore described, the left-hand and right-hand annular chambers 37 and 36 on respective sides of the partition member 25 are also communicated with each of the drain holes 26 through the radial passages 32a and 32b and then through the circumferential grooves 38a and 38b, respectively.

In the construction hereinbefore fully described, any leakage past the axial-mechanical face seal assembly 16 may enter the annular gap between the inner peripheral face 27 and the shaft 1. However, since the annular chambers 36 and 37 are communicated with each other through the annular gap between the inner peripheral face 27 and the shaft 1, air entering the annular chamber 36 from the drain holes 26 through the circumferential groove 38b and then through the radial passages 32b flows into the annular chamber 37 through the annular gap between the inner peripheral face 27 and the shaft 1 and is subsequently discharged to the outside through the radial passages 32a, then the circumferential groove 32a, and finally the drain holes 26, while scavenging the leakage, as indicated by the arrow-headed phantom line. Accordingly, any vapor intruding into the annular chamber 37 past the axial-mechanical face seal assembly 16 can be purged to the outside of the housing 2 by the flow of the air without reaching the bearing assembly 3. In view of this, any component parts of the bearing assembly 3 including the outer race 4, the annular sealing member 13 adjacent the partition member 25 and any wall defining the right-hand annular chamber 36 can be kept substantially dry with no possibility of the formation of water drops which would otherwise result from the condensation of the vapor when and after the pump has been brought to a halt with the temperature thereof lowering to the ambient temperature. This in turn avoids any possible rusting of the bearing assembly, and therefore, the service life of the pump can be advantageously prolonged. Any lubricant used in the bearing assembly 3 does not leak into the space 24 and then towards the axial-mechanical seal assembly 16 in any manner whatsoever, because the prevention of the leakage into the bearing assembly 3 is effective to protect any elastic seal member used in the bearing assembly 3 from being deteriorated.

When assembling the pump using the fluid-tight shaft mounting according to the present invention, the bearing assembly, the partition member and the axial-mechanical face seal assembly are sequentially mounted on the pump shaft to provide a unitary assembly which is subsequently to be mounted in the pump housing. Not only is this mounting procedure simple and easy to perform, but also the adjustment of the parts of the axial-mechanical face seal assembly can be performed subsequent to the assembly of the unitary assembly with no complicated adjusting procedure inherent in the prior art being required.

Figure 6:
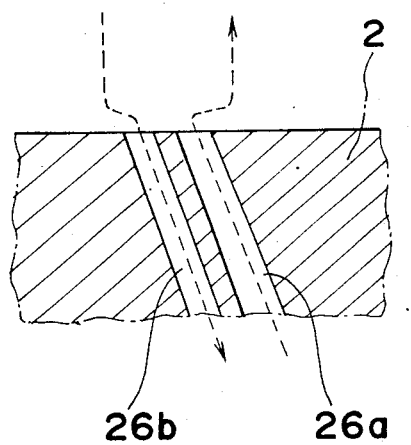
FIG. 6 is a sectional view, on a further enlarged scale, of a portion of the water pump housing, showing a modified form of drain holes defined therein.

Although the present invention has been described by way of example with the preferred embodiment thereof with reference to the accompanying drawings, it is to be noted here that various changes and modifications are apparent to those skilled in the art without departing from the spirit and scope of the present invention as defined by the appended claims. By way of example, where the housing 2 has a relatively small wall thickness, each of the drain holes 26 may be concurrently used for the passage of the air into the space 24 and for the drainage of the leaking fluid together with the air such as shown and described because the air can flow at increased velocity enough to induce a convection by which the leaking fluid can be purged. However, where the wall thickness of the housing 2 is relatively great, it is preferable to employ two separate holes 26a and 26b, as shown in FIG. 6, in communication with the right-hand and left hand chambers 36 and 37, the hole 26a serving as an air intake passage while the holes 26b serves as a drain passage.

Moreover, although the inner peripheral face 27 of the radial body 28 of the partition member 25 has been described and shown as formed with the helical grooves 31, it may have a plurality of projections or a plurality of grooves of generally triangular or semi-circular cross-section, provided that they serve the purpose of inducing streams of air directed towards the axial-mechanical face seal assembly 16.

The radial passages 32a and 32b may be in the form of through-holes each extending completely through the thickness of the wall of the associated axial flange 29 or 30, and the circumferential grooves 38a and 38b may be employed in the form of grooves each open only towards the inner peripheral surface of the housing 2.

Yet, the details of the bearing assembly 3 may not be limited to that shown, but may be of a type utilizing spaced-apart ball bearings or spaced-apart roller bearings.

Accordingly, such changes and modifications are to be understood as included within the scope of the present invention.

What is claimed is:

1. A fluid-tight shaft mounting for rotatably and fluid-tightly supporting a shaft member having one end rigidly mounted with a driven element, which comprises:

a generally tubular housing through which the shaft member extends;

a sealed bearing assembly positioned within the housing and exteriorly around the shaft member for the support of the shaft member relative to the housing;

an axial-mechanical face seal assembly interposed between the driven element and the sealed bearing assembly, and exteriorly around the shaft member;

said housing having at least one passage defined therein for communicating a space, between the bearing assembly and the face seal assembly, with the outside of the housing; and an annular partition member disposed within the housing around the shaft member so as to divide the space between the bearing assembly and the face seal assembly into first and second annular chambers adjacent the bearing assembly and the face seal assembly, said partition member comprising an annular radial body having its outer periphery formed with first and second axial flanges that protrude perpendicular to the radial body in opposite directions away from each other and terminate in abutment respectively with a portion of the bearing assembly and a portion of the face seal assembly, said radial body having its inner peripheral face spacedly surrounding the shaft member and formed with guide grooves, said first and second axial flanges having respective passage means defined therein in fluid-connected relationship with the passage in the housing.

2. The mounting as claimed in claim 1, wherein the bearing assembly includes an outer race press-fitted into the housing and has first and second annular ends opposite to each other, the first annular end being positioned so as to confront the partition member, and wherein the first axial flange has its annular free end radially inwardly stepped to receive the first annular end of the outer race.

3. The mounting as claimed in claim 1, wherein the face seal assembly comprises first and second annular retaining members fixed to the housing and the shaft member, respectively, in axially spaced relation to each other, first and second annular buffer members carried by the first and second retaining members, respectively, so as to confront with each other, a rotatable seal ring carried by the second buffer member, a stationary seal ring carried by the first buffer member, and a biasing element operable to urge the stationary seal ring to slidingly contact the rotatable seal ring.

* * * * *